United States Patent Office 2,826,556
Patented Mar. 11, 1958

2,826,556

POLYBUTADIENE RESIN

Frank P. Greenspan and Anthony E. Pepe, Buffalo, N. Y., assignors to Food Machinery and Chemical Corporation, San Jose, Calif.

No Drawing. Application July 26, 1955
Serial No. 524,600

5 Claims. (Cl. 260—2)

This invention pertains to a process of making synthetic resins and more particularly to a process of making synthetic resins useful for castings and coatings using polybutadiene as the raw material.

Because of its ready availability and its physical properties, polybutadiene is a potentially useful raw material for the production of thermosetting synthetic resins. Although it is possible to use polybutadiene directly for making coatings, these coatings are not entirely satisfactory, usually showing lack of adhesion and lack of toughness. Particularly difficult is the production of useful castings from polybutadiene.

It has been found in accordance with the present invention that treatment of the polybutadiene with specific oxidizing agents followed by treating the oxidation product with primary or secondary polyamines, permits the production of resins which will give excellent casting or coatings, which are tough, flexible and well adherent.

The process of this invention comprises a series of steps which will be more fully discussed hereinafter. In principle, polybutadiene is treated in this process first with an organic peracid. The resulting oxidized product is then treated with a primary or secondary polyamine. This last treatment is carried out under conditions which are directly suitable for the production of castings or coatings. If it be desired to produce a casting, the oxidation product resulting from treating polybutadiene with an organic peracid is mixed with a suitable primary or secondary polyamine and the mixture then poured into a mold. Upon heating, the mixture will then set to a hard tough and usually light colored cast resin.

If it be desired to form a coating, the oxidation product obtained by treating polybutadiene with an organic peracid is mixed in solvent solution with a suitable primary or secondary polyamine and this solvent mixture then applied to the surface to be coated and the coating heated. Upon evaporation of the solvent, a tough, flexible and strongly adherent coating is then obtained.

Polybutadiene generally can be used as the raw material in the process of this invention. Production of useful oxidized polybutadienes in the sense of this invention requires a starting material of a certain minimum chain length, i. e. degree of polymerization. No theoretical upper limit exists for the chain length of the unsaturated starting material to be oxidized in accordance with this invention. However, there are certain practical considerations which impose a limit on the degree of polymerization of the starting material. Because the oxidation reaction has to be carried out in the liquid phase, the starting material must either be a liquid or must be soluble in a suitable reaction medium. Many highly polymerized compounds are solids of little or no solubility in otherwise useful solvents and in this respect, a practical upper limit is imposed on the degree of polymerization of the starting material. In other words, the practical requirement imposed by the need of working in the liquid phase limits the choice of starting material. However, the degree of polymerization of the starting material will also have to be considered in connection with the properties desired in the oxidized product. A highly polymerized starting material will produce an oxidized product of somewhat different properties than would be obtained by the use of a starting material of a lower degree of polymerization.

The physical state of polybutadiene is determined by degree of polymerization and molecular weight and is conventionally indicated by viscosity data. The polybutadiene employed in the following examples is thus characterized. Although in those examples, polybutadiene of a viscosity of about 1500 Cp. at 100° F. is illustrated, it is to be understood that any liquid or properly soluble polybutadiene of higher or lower molecular weight and viscosity may be used.

The oxidation of the polybutadiene is carried out in accordance with this invention by treating it with an organic peracid. Although organic peracids soluble in the reaction medium or in polybutadiene can be generally used, we prefer to employ the aliphatic peracid peracetic acid or performic acid. The oxidation reaction may be carried out using a preformed peracid or the peracid may be formed from its constituents during the oxidation reaction and in the reaction medium.

When oxidizing the polybutadiene with the organic peracid, stoichiometric amounts of the peracid may be used or amounts below that theoretically required completely to oxidize the double bonds present in the polybutadiene. In the following examples, polybutadiene treated with the stoichiometric amount of peracid will be designated as "100% oxidized." Polybutadienes oxidized with reduced amounts of peracid will be designated by a percent figure to indicate what might be termed the degree of oxidation in terms of the fraction of the theoretical amount of peracid used. The reactivity and resin forming properties of the oxidized polybutadiene will obviously vary with its degree of oxidation. Generally speaking, a 100% oxidized polybutadiene will be more reactive and will more readily form a casting or coating resin than polybutadiene oxidized to a lesser extent. At the same time the properties of the finished casting or coating will also be influenced to an extent by the degree of the oxidation of the polybutadiene.

As indicated above, the oxidized polybutadiene is subsequently treated with primary or secondary polyamines. Examples of polyamines which may be used in the process of this invention are: methyl piperazine, dimethyl piperazine, propylene diamine, diethylene triamine, tetraethylene pentamine, m-phenylene diamine, iminobis-propylamine, triethylene tetramine and others. Certain limitations on the choice of such polyamines are, however, imposed by the practical process requirements. If casting resins are to be produced, the oxidized polybutadiene has to be mixed with such polyamines before casting and heating. To permit proper mixing, the two main reactants, the oxidized polybutadiene and the polyamine should be liquid. Therefore, in the case of casting resins, the polyamines should be those liquid at ordinary temperature or those which possess a relatively low melting point to permit mixing at room temperature or somewhat elevated temperature. In the case of coating resins, a solvent is invariably used from which the coating is then obtained by evaporation. In this case the polyamines used are those soluble in the solvent from which the coating is to be made.

The amount of primary or secondary polyamines to be used for treating oxidized polybutadiene depends on the degree of oxidation of the polybutadiene and the particular polyamine used. Generally speaking, one equivalent weight of oxidized polybutadiene, that is, the weight of polybutadiene containing 16 g. of oxirane oxygen, is treated with one equivalent weight of the polyamine. The equivalent weight of the polyamine is here defined as the molecular weight of the polyamine divided by the number of amino groups in the polyamine. The amount of polyamine calculated in this way represents the theoretical amount for complete reaction with one equivalent weight of the oxidized polybutadiene. For example, if a sample of oxidized polybutadiene is found by analysis to contain 6.6 g. of oxirane oxygen per 100 grams of product, the equivalent weight of the product will then be $$\frac{100.16}{6.6}$$

or 242 grams. If this product is to be treated with, e. g. m-phenylene diamine, calculation shows that the equivalent weight of this polyamine is $$\frac{108}{2}$$

or 54 grams. The theoretical amount of m-phenylene diamine to be used with this particular oxidized polybutadiene would then be $$\frac{54}{242}$$

or 0.222 gram of polyamine per gram of this particular oxidized polybutadiene.

In accordance with this invention, from 10 to 100% of the calculated theoretical amount of primary or secondary polyamines may be used in the production of the new casting or coating resins of this invention.

The following examples will illustrate in some detail the principle of this invention. In Example 1, in particular, the process will be described in full detail.

*Example 1*

300 g. of a polybutadiene, viscosity 1500 cp. at 100° F., were dissolved in 300 g. of toluene. To this solution were added 57.3 g. of glacial acetic acid and 50.8 g. of a sulfonic acid type cation exchange resin. The mixture was heated to 60° C. and maintained at this temperature. Then 145.8 g. of hydrogen peroxide 50% were added over a period of 1 and 1¼ hours to produce peracetic acid. This amount of hydrogen peroxide corresponds to about 50% of the stoichiometric amount required fully to oxidize the polybutadiene. After an additional 1½ hours at 60° C., the reaction was complete and the oxidized polybutadiene recovered by vacuum drying after washing with water and then with an aqueous solution of potassium hydroxide. The resulting product was analyzed and found to contain 6.63% oxirane oxygen, which was determined by an analytical procedure corresponding essentially to that of Swern et al., described in Analytical Chemistry, 19, 404 (1947).

To 10 g. of this product were then added 2.1 g. of 2-methyl piperazine, the mixture poured into a mold and baked for 15½ hours at 165° C. After cooling and removal from the mold, a hard and tough thermoset coating was obtained.

*Example 2*

Another sample of the same polybutadiene was oxidized with acetic acid and hydrogen peroxide (peracetic acid) as described in Example 1, but 8.12 g. of 50% sulfuric acid were used as a catalyst instead of the ion exchange resin. The product upon analysis showed an oxirane oxygen content of 4.91%.

10 g. of this product was then mixed with 2.4 g. of dimethyl piperazine. This mixture was poured into a mold and baked for 15½ hours at 165° C. After cooling and removal from the mold, a hard and tough thermoset casting was obtained.

*Example 3*

300 g. of polybutadiene, viscosity 1500 cp. at 100 F., were dissolved in 300 g. of toluene and to this were added 6.0 g. of anhydrous sodium acetate. To this mixture was added slowly over a period of one hour, 372 g. of peracetic acid (41%) and the mixture maintained for a total reaction time of 4½ hours at 30° C. This amount of peracetic acid corresponds to about 50% of the stoichiometric amount required fully to oxidize the polybutadiene. After recovery, as described in Example 1, the product was analyzed and found to contain 6.6% oxirane oxygen.

To 10 g. of the product were then added 1.14 g. of propylene diamine. This mixture was then poured into a mold and baked for 8 hours at 165° C. After cooling and removal from the mold, a hard and tough casting was obtained.

*Example 4*

A sample of polybutadiene, viscosity 1500 cp. at 100° F., was oxidized as described in Example 2. After recovery, the product was analyzed and found to contain 4.91% oxirane oxygen.

To 10 g. of this product were then added 1.06 g. of diethylene triamine. This mixture was then poured into a mold and baked for 8 hours at 165° C. After cooling and removal from the mold, a hard and tough casting was obtained.

*Example 5*

Another sample of the same polybutadiene was oxidized with peracetic acid as described in Example 1. The oxidized product was analyzed and found to contain 6.63% oxirane oxygen.

To 10 g. of this product were then added 1.56 g. of tetraethylene pentamine. This mixture was then poured into a mold and baked for 8 hours at 165° C. After cooling and removal from the mold, a hard and tough casting was obtained.

*Example 6*

Another sample of the same polybutadiene was oxidized with peracetic acid as described in Example 3. The product upon analysis showed an oxirane oxygen content of 6.6%.

To 10 g. of the product were added 2.23 g. of m-phenylene diamine. This mixture was then poured into a mold and baked for 16 hours at 165° C. After cooling and removal from the mold, a hard and tough casting was obtained.

*Example 7*

300 g. of polybutadiene, viscosity 1500 cp. at 100° F., were dissolved in 300 g. of toluene and then were added 49.1 g. of 90% formic acid. To this mixture, which was maintained at 30° C., were then added slowly over a period of about 45 minutes, 195.8 g. of 50% hydrogen peroxide. This amount of hydrogen peroxide corresponds to about 50% of the stoichiometric amount required to oxidize the ethylenic unsaturation of the polybutadiene completely. The reaction was complete after 26 hours at a temperature which was maintained below 35° C. After washing and recovery, the product was analyzed and found to contain 5.8% oxirane oxygen.

To 10 g. of the product were then added 1.58 g. of 3,3-imino-bis-propylamine. This mixture was poured into a mold and baked for 4 hours at 165° C. After cooling and removal from the mold, a flexible, tough casting was obtained.

*Example 8*

A sample of polybutadiene, viscosity 1500 cp. at 100° F., was oxidized with peracetic acid as described in Example 3, but the amount of peracetic acid used corresponded to only 35% of the stoichiometric amount necessary fully to oxidize the polybutadiene. Analysis showed that the product contained 4.6% oxirane oxygen.

To 10 g. of the product were then added 1.06 g. of propylene diamine. This mixture was then poured into a mold and baked for 16 hours at 150° C. After cooling and removal from the mold, a tough casting was obtained which was slightly flexible.

Example 9

Another sample of polybutadiene oxidized as described in Example 8, was prepared and upon analysis was found to contain 4.6% oxirane oxygen.

To 10 g. of the product were then added 1 g. diethylene triamine. This mixture was poured into a mold and baked for 16 hours at 150° C. After cooling and removal from the mold, a tough, slightly flexible, casting was obtained.

Example 10

A sample of polybutadiene, viscosity 1500 cp. at 100° F., was oxidized with peracetic acid as described in Example 1, but the amount of oxidizing agent used was only about 35% of the stoichiometric amount required to oxidize the double bonds of polybutadiene completely. After recovery, the product was analyzed and found to contain 4.6 % oxirane oxygen.

To 10 g. of this product were added 1.05 g. of triethylene tetramine. This mixture was then poured into a mold and baked for 16 hours at 150° C. After cooling and removal from the mold, a tough casting was obtained.

Example 11

400 g. of polybutadiene, viscosity 1500 cp. at 100° F., were dissolved in 600 ml. of xylene to which mixture was then added, over a period of 1 hour and 20 minutes, 1100 g. of 40% peracetic acid and 45 g. of sodium acetate. This amount of peracetic acid corresponds to the stoichiometric amount required fully to oxidize the polybutadiene. The mixture was maintained for 1½ hours at 15 to 20° C., for 2½ hours at 25 to 30° C., and for about 1 hour at 35°., for a total reaction time after addition of peracetic acid of 5 hours. The product was washed with salt solution and subsequently with an aqueous solution of potassium hydroxide. Excess solvent was removed under vacuum at about room temperature. The recovered product was then dissolved in additional xylene resulting in a solution containing 49.6 g. of product per 100 ml. of solution. Analysis showed that the finished product contained 6.75% oxirane oxygen.

Part of the solvent solution of the product was then dosed with triethylene tetramine in an amount corresponding to 0.038 g. of triethylene tetramine per gram of solids in the solution. Thereafter, a glass plate was uniformly coated with the solution and heated for two hours at 150° C. The coating obtained after removal from the oven was found to be hard and tough and showed excellent adhesion to the glass.

Example 12

150 g. of an emulsion polymerized polybutadine rubber (viscosity 1600 cp. in 75% toluene solution) were dissolved in 150 g. of toluene and to this mixture was added slowly 474 g. of peracetic acid 40% and 20.8 g. of sodium acetate. The reaction mixture was kept for 75 minutes at about 23° C. and for an additional 60 minutes of about 27° C. The product was washed with distilled water, then with a salt solution and finally with a salt solution containing a small amount of potassium hydroxide. The product was recovered by filtration and excess solvent removed under reduced pressure at room temperature. The final product represented a toluene solution of 58.6% solids content and the oxidized polybutadiene had an oxirane oxygen content of 5.09%.

To a portion of this toluene solution of oxidized polybutadiene was added triethylene tetramine in an amount corresponding to 0.116 g. per gram of oxidized polybutadiene in solution. A glass plate was coated uniformly with the resin solution and heated for 2 hours at 150° C. This produced a rubbery resin coating which showed very good adhesion to the glass plate.

It is possible to catalyze the curing of oxidized polybutadiene by introducing phenoxide ion into the mixture of oxidized polybutadiene and polyamine. This can be accomplished in various ways, very readily, for instance, by introducing a minor quantity of phenol into the above mixture. As shown in the following example, phenol addition will produce, under the same conditions, a harder casting than otherwise obtained.

Example 13

A sample of polybutadiene, viscosity 1500 cp. at 100° F., was oxidized with peracetic acid as described in Example 1. The amount of peracetic acid used here corresponded to about 50% of the stoichiometric amount required fully to oxidize the polybutadiene. After recovery, the product was analyzed and found to contain 6.19% oxirane oxygen.

To 20 g. of this product were then added 2.84 g. of triethylene tetramine and 1.0 g. of phenol. The mixture was poured into a mold and baked for 2½ hours at 150° C. After cooling and removal from the mold a tough casting was obtained which showed a Barcol hardness of about 60.

In a parallel test, 20 g. of product mixed with 2.84 g. of triethylene tetramine wtihout the addition of phenol were cured in the same manner for the same time and at the same temperature. After cooling and removal from the mold, a tough casting was obtained with a Barcol hardness of about 6.

What is claimed is:

1. Method of producing thermoset resins from a soluble epoxidized polybutadiene formed by reaction of an aliphatic peracid with a soluble homopolymeric polybutadiene, which comprises contacting said soluble epoxidized polybutadiene with a polyamine whose amino groups are each independently selected from the group consisting of primary and secondary amino groups in an amount corresponding to at least 10% of the amount required for complete reaction with said soluble epoxidized polybutadiene, and heating the resulting mixture until a thermoset resin has been formed said amount being calculated on the basis that one oxirane oxygen is equivalent to one amino group.

2. The step in the production of thermoset resins from a soluble epoxidized polybutadiene formed by reaction of peracetic acid with a soluble homopolymeric polybutadiene, which step comprises contacting said soluble epoxidized polybutadiene with a polyamine whose amino groups are each independently selected from the group consisting of primary and secondary amino groups in an amount corresponding to at least 10% of the amount required for complete reaction with said soluble epoxidized polybutadiene, and heating the resulting mixture until a thermoset resin has been formed said amount being calculated on the basis that one oxirane oxygen is equivalent to one amino group.

3. The step in the production of thermoset resins from a soluble epoxidized polybutadiene formed by reaction of performic acid with a soluble homopolymeric polybutadiene, which step comprises contacting said soluble epoxidized polybutadiene with a polyamine whose amino groups are each independently selected from the group consisting of primary and secondary amino groups in an amount corresponding to at least 10% of the amount required for complete reaction with said soluble epoxidized polybutadiene, and heating the resulting mixture until a thermoset resin has been formed said amount being calculated on the basis that one oxirane oxygen is equivalent to one amino group.

4. The step in the production of thermoset resins from a soluble epoxidized polybutadiene formed by reaction of an aliphatic peracid with a soluble homopolymeric polybutadiene, which step comprises contacting said soluble epoxidized polybutadienes with a polyamine whose amino groups are each independently selected from the group consisting of primary and secondary amino groups in an amount corresponding to at least 10% of the amount required for complete reaction with said soluble epoxidized polybutadiene, and about 4% by weight on the combined weight of epoxidized polybutadiene and polyamine of phenol, and heating the resulting mixture until a thermoset resin has been formed said amount being calculated on the basis that one oxirane oxygen is equivalent to one amino group.

5. As a new composition of matter, a thermoset resin produced by the method of claim 1.

References Cited in the file of this patent

UNITED STATES PATENTS

| | | |
|---|---|---|
| 1,988,448 | Hopff et al. | Jan. 22, 1935 |
| 2,136,928 | Schlack | Nov. 15, 1938 |
| 2,660,563 | Banes et al. | Nov. 24, 1953 |

FOREIGN PATENTS

| | | |
|---|---|---|
| 369,716 | Great Britain | Mar. 21, 1932 |